Nov. 13, 1962 K. J. BURKHARDT 3,063,565

ION EXCHANGE UNIT

Filed Sept. 21, 1959

INVENTOR.
Kenneth J. Burkhardt
BY
Atty.

United States Patent Office 3,063,565
Patented Nov. 13, 1962

3,063,565
ION EXCHANGE UNIT
Kenneth J. Burkhardt, Oceanside, N.Y., assignor to Union Tank Car Company, Chicago, Ill., a corporation of New Jersey
Filed Sept. 21, 1959, Ser. No. 841,309
1 Claim. (Cl. 210—190)

The invention relates to an ion exchange arrangement and particularly a unit employing a unique generally spherical tank.

After a period of service ion exchange units become exhausted. After bed exhaustion regeneration is necessary—such regeneration being usually accomplished by first backwashing and then passing a regenerant fluid downwardly through the bed, the bed being held in compression by its own weight and the downward flow of regenerating liquid.

Usually backwashing is accomplished with clear water by passing the water into the unit through the collector arrangement at the unit bottom and then upwardly through the bed and out of the tank through a collector or distributor located in the upper freeboard area. During the backwashing operation, it is of course desirable and necessary to completely agitate the bed and remove dirt and other physical material from fixation with bed particles and carry same out of the unit. An important factor in accomplishing satisfactory back-washing is the velocity of the back-washing water in the different parts of the unit.

With the above in mind, it is a primary object of the invention to provide a unique ion exchange unit that has a tank formed in generally spherical or globular form having certain physical characteristics that materially aid the performance characteristics of the unit.

It is a more specific object of the invention to provide an ion exchange tank arrangement of the type described, having an ion exchange bed arranged centrally as seen in elevational view whereby liquid flow characteristics through the bed are improved.

It is a further specific object of the invention to provide an arrangement of the type described, having an underdrain collector arrangement at the lower portion of the bed, a regenerant distributor arrangement immediate above the top surface of the bed, and a collector located above the regenerant distributor and below the top of the generally spherical tank arrangement.

Figure 1:
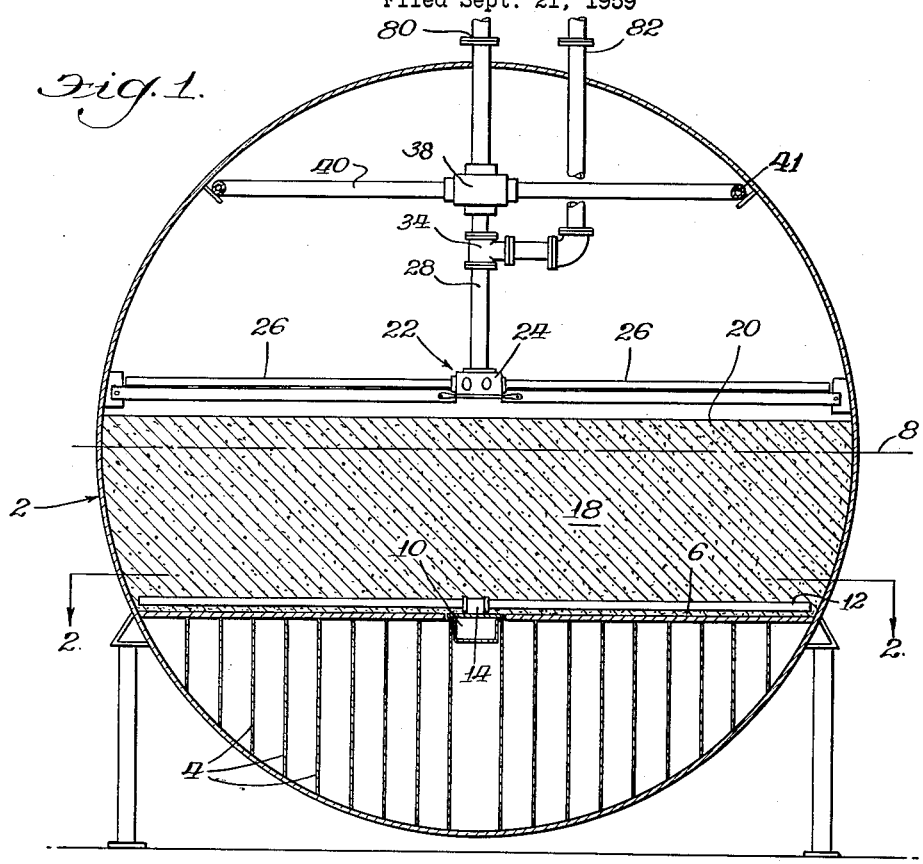
Figure 2:
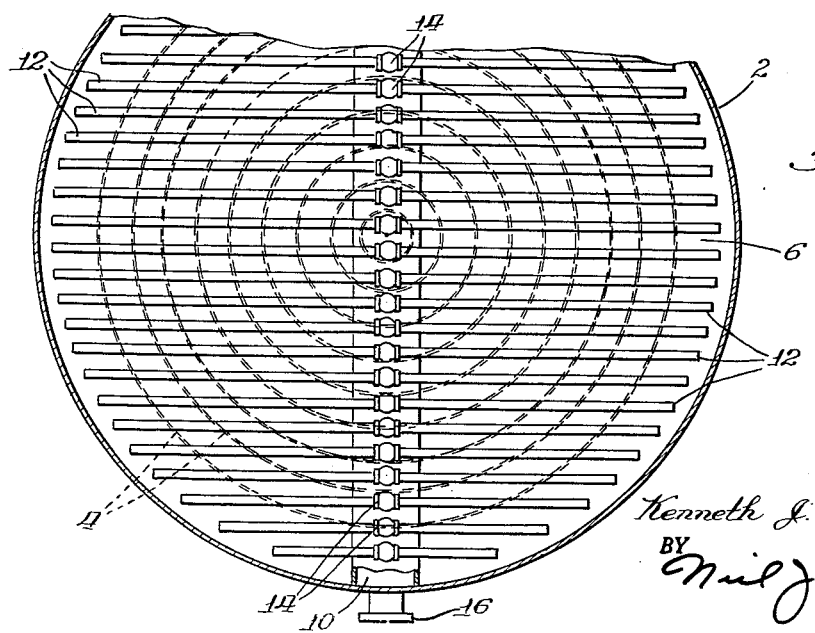

These and other objects of the invention will become apparent in the course of the following description, and from an examination of the associated drawings, wherein:

FIGURE 1 is a vertical sectional view partially in elevation of a preferred embodiment of the ion exchange unit here under consideration, FIGURE 2 is a sectional view taken approximately along line 2—2 of FIGURE 1.

Describing the invention in detail, attention is first directed to FIGURE 1 wherein the numeral 2 indicates a generally spherical or globular tank which houses the ion exchange bed. The tank 2 has disposed therein a plurality of annular plates 4, 4 in concentric arrangement relative to each other and having their lower ends secured to the inner periphery of the tank 2 and extending upwardly (parallel to the vertical) to engage and provide support for the under-surface of a bed-supporting plate 6. The bed-supporting plate 6 extends over the cross-sectional area of the tank at its location, and is peripherally secured to the inner tank wall. It will be noted that the plate 6 is located substantially below and generally parallel to the equatorial center plane of the tank, as indicated by the line 8.

An underdrain collector trough indicated at 10 is formed immediately below the plate 6, and as seen in FIGURE 2, extends diametrically across the tank 2. A plurality of collecting laterals 12, 12 are arranged in perpendicular relation to the collector trough 10 and extend across the entire area of the plate 6, providing access to substantially all of the cross-sectional area of the tank 2 at that point. The laterals 12, of course, are provided with a plurality of openings across their surfaces (not shown), and further are in communication with the trough 10 as indicated at 14. One end of the trough 10 communicates with an outlet port 16 on the side of the tank 2.

The plate 6 provides horizontal support for a relatively thick bed of ion exchange resin material, indicated at 18. In the preferred embodiment the bed 18 extends upwardly in the spherical tank 2, and the top surface thereof 20 is preferably located above the horizontal equatorial center plane of the plane as indicated at 8. A regenerant distributor, indicated generally at 22, comprises a central manifold hub 24 and a plurality of radially arranged extensions 26 extending radially outwardly therefrom to approximately the inner surface of the tank shell 2 to provide substantially complete access to the top of the bed 20. The regenerant distributor 22 is, of course, located immediately above the top of the bed 20. The manifold 24 communicates with a downcoming pipe 28 which, in turn, is conventionally piped to an influent inlet 80 and a regenerant inlet 82 via the pipe T 34. Conventional valving (not shown) is, of course, provided to offer selective flow through the inlets 80 or 82, respectively. The inlet 80 additionally communicates through a manifold header 38 which establishes communication with a plurality of inlet distributors and collectors 40 which extent radially outwardly from the manifold 38 and in a generally horizontal plane generally parallel to the bed surface and spaced from the top of the tank as seen in elevational view. It will be noted, however, that the distributor 40 includes an annular member 41 which communicates with the radial members.

With the above structure in mind, it will be apparent that on bed exhaustion the influent inlet is closed. A back-washing water is then introduced at the port 16 through the trough 10 and laterals 12, and it is forced upwardly through the bed 18 inducing bed agitation and expansion. Because of the spherical form of the tank especially in the bed area and to the location of the distributor 40 it will be readily apparent that the cross-sectional area of the bed is greatest at the horizontal equatorial plane 8, and diminishes as we depart upwardly or downwardly from that equatorial plane. It will also be understood that the velocity of fluid flow through the bed, assuming adequate inlet and outlet capacity, is related to the cross sectional area of the bed at any given point. Thus, upon downward liquid flow, it will be understood that the rate of flow increases as we approach the plate 6 because of the reduced cross sectional area. In service this increasing date of flow has the unique advantage of improving effluent quality at the quality determining bed areas adjacent the bed bottom. This is particularly true during service operation where external conditions dictate low flow rates substantially below the design rate of the unit. Under these conditions the unit here considered maintains acceptable quality of effluent as compared to those heretofore employed in the art.

Considering the back-washing operation, it wil be understood that this action tends to and does expand the bed upwardly into the lowering cross-sectional freeboard areas of the spherical tank 2. Again, the varying cross-sectional area of the tank accommodates increased back-washing velocity in these areas adjacent the top of the bed and its expanded top. This increased velocity increases the resin particle scrubbing effect thereby enhancing the physical cleaning of the resin of any dirt that may have affixed to the various particles; and further, the increased back-wash water velocity aids in the physical removal of dirt particles. Another improved feature of the velocity variations herein mentioned is that less back-wash water is required in a given cycle to accomplish the desired cleaning.

Thus, it will be seen that I have provided an ion exchange unit that affords improved and more efficient ion exchange operation as above described. It will also be noted that the ion exchange arrangement and structure illustrated lends itself to economical manufacture and resulting low initial cost, and is further efficiently adaptable to large scale ion exchange unit installations.

The invention as shown is by way of illustration and not limitation, and may be subject to various modifications without departing from the spirit thereof or the scope of the appended claim.

What is claimed is:

Ion exchange liquid treatment apparatus comprising:
(A) an immobile substantially spherical stationary tank;
(B) a supporting plate secured to the interior wall of said tank,
 (1) said plate lying in a plane substantially parallel to the horizontal plane of maximum tank diameter,
 (2) said plate being located a substantial distance below said plane,
 (3) there being a lower smooth-surfaced equatorial zone in said tank between said plate and said plane;
(C) a bed of ion exchange material supported on said plate,
 (1) said bed extending upwardly through said lower zone to an elevation slightly above said plane,
 (2) there being an upper smooth-surfaced equatorial zone in said tank above said plane for permitting upward expansion of said bed under the influence of upwardly flowing liquid currents;
(D) a treated liquid collector and backwash distributor located beneath said bed adjacent said plate,
 (1) said liquid collector and backwash distributor having openings distributed substantially uniformly beneath said bed,
 (2) A liquid inlet and outlet conduit extending through said tank below said bed and connected to said liquid collector and backwash distributor,
 (3) means for supplying liquid under pressure connected to said conduit for expanding said bed upwardly,
(E) a liquid and regenerant distributor disposed across the upper surface of said bed,
 (1) said liquid and regenerant distributor being located immediately adjacent the upper surface of said bed during ion exchange treatment of liquid in said tank,
 (2) a regenerant inlet conduit extending through the top of said tank and connected to said liquid and regenerant distributor above said bed,
 (2) an untreated liquid inlet conduit extending through the top of said tank and connected to said liquid and regenerant distributor above said bed;
(F) a combined liquid distributor and backwash collector including an annular member connected to a plurality of radial members,
 (1) said member and members being located in a generally horizontal plane generally parallel to the upper surface of said bed,
 (2) the last mentioned plane being spaced a substantial distance vertically above said liquid and regenerant distributor,
 (3) said combined liquid distributor and backwash collector being connected to said untreated liquid inlet conduit and to means for discharge of backwash liquids;

whereby the smooth-surfaced spherical configuration of said tank between said plate and said combined liquid distributor and backwash collector causes said bed to present a uniformly decreasing circular surface area to untreated liquid and regenerant flowing downwardly to said treated liquid collector and also causes said bed to present a uniformly decreasing surface area to backwash liquid flowing upwardly through the expanded bed to said backwash collector, thus minimizing the size of the tank and reducing the volume of backwash water required for efficient operation of the apparatus.

References Cited in the file of this patent

UNITED STATES PATENTS

| | | |
|---|---|---|
| 514,531 | Williamson | Feb. 13, 1894 |
| 522,043 | Bowden | June 26, 1894 |
| 873,458 | Reeves et al. | Dec. 10, 1907 |
| 2,466,662 | Mindler | Apr. 5, 1949 |
| 2,732,948 | Koupal et al. | Jan. 31, 1956 |